United States Patent Office 3,196,185
Patented July 20, 1965

3,196,185
TRIS (HYDROXYARYL) ALKANE COMPOUNDS AND PROCESSES FOR THEIR PREPARATION
Derek Ranson, Norton-on-Tees, England, assignor to Imperial Chemical Industries Limited, London, England, a corporation of Great Britain
No Drawing. Filed July 22, 1960, Ser. No. 44,547
Claims priority, application Great Britain, Apr. 14, 1960, 13,444/60
5 Claims. (Cl. 260—619)

This invention relates to tris (hydroxyaryl) compounds, particularly tris (hydroxyphenyl) alkanes, and to processes for the preparation of such compounds.

A saturated aldehyde will condense with a hydroxyaryl compound which has a free ortho or para position, to give a gem-hydroxyaryl derivative. We have found, however, that aldehydes containing an alpha-beta double bond and an unsubstituted alpha carbon atom will condense to give a tris (hydroxyaryl) propane derivative, in which the third hydroxyaryl group condenses to the double bond.

Accordingly, the present invention provides tris (hydroxyaryl) propane compounds in which the hydroxyaryl groups are attached directly by their ortho or para positions to the chain —C—CH—CH, two of the said hydroxyaryl groups being attached to the said chain by the terminal carbon atom which is shown with a hydrogen atom attached thereto.

It will be understood that the ortho and para positions are relative to the hydroxyl radicals of the hydroxyaryl groups.

The chain is preferably part of an alkyl chain which may be branched.

The hydroxyaryl groups are preferably hydroxyphenyl groups, particularly alkyl substituted hydroxy phenyl groups in which at least one ortho position is occupied by an alklyl radical. Particularly preferred compounds according to the present invention comprise those in which the propane chain forms part of a hydrocarbon chain and is attached to the para positions of three identical hydroxyphenyl radicals to each of which in addition there is a methyl radical at the 3 position and a tertiary butyl radical at the 6 position; the hydroxyl group being regarded as occupying the 1 position.

The compounds of the present invention may be regarded as the non-resinous condensation products of an aldehyde having an alpha-beta double bond and an unsubstituted alpha carbon atom, with one or more hydroxyaryl compounds each having a free ortho or para position, the molar ratio of the hydroxyaryl compound or compounds to the aldehyde being 3:1. We have found that this condensation may be effected in one step in the presence of a condensing agent and a solvent, preferably using at least three moles of the hydroxy aryl compound to each mole of the aldehyde. The presence of the solvent is essential, and although we do not wish to be bound by any express theory, the solvent is believed to inhibit the formation of resinous products which would otherwise be produced. The solvent must be inert to the reaction material and may for example be methanol or glacial acetic acid.

Any condensing agent which is suitable for condensing aldehydes and hydroxyaryl compounds may be used such as zinc chloride, strong sulphuric acid, or fluor sulphonic acid, but we prefer to use strong hydrochloric acid.

The reaction is preferably carried out at moderately elevated temperatures, for example sufficient to boil the solvent under reflux.

The product may be recovered in any convenient fashion, but if the product is solid we prefer to add an entraining agent, preferably toluene, when the reaction is substantially complete, and thereafter to distil the mixture until substantially pure toluene distils off, finally cooling the residue and recovering the solid product which is deposited.

The aldehyde used is preferably aliphatic, and may for example be crotonaldehyde, acrolein, or cinnamaldehyde.

The hydroxyaryl compound used in the reaction is preferably an alkyl phenol such as 3-methyl-6-tert. butylphenol, which has two free reactive positions on the nucleus.

The tris (hydroxyaryl) propane compounds therefore have the structure:

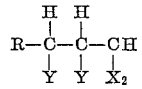

wherein R is selected from the group consisting of hydrogen, methyl and phenyl, X is selected from the group consisting of lower alkyl 3,6 disubstituted hydroxyphenyl attached to the carbon atom directly by its ortho position and lower alkyl 3,6 disubstituted hydroxyphenyl attached to the carbon atom directly by its para position, and Y is selected from the group consisting of hydrogen and X with one Y being hydrogen and one Y being the same as X.

The compounds provided by the present invention are valuable antioxidants, particularly in high molecular weight hydrocarbons such as natural and synthetic rubber and in polyolefines, particularly polyethylene and polypropylene and polyethylene terephthalate. They are particularly useful antioxidants in media in which staining is undesirable, and are effective in such media in minor amounts preferably not exceeding 1% by weight.

EXAMPLE 1

70 grams (1 gram mole) of crotonaldehyde were added during 1 hour to a mixture of 492 grams (3 gram moles) of 3-methyl-6-tert.butylphenol, 285 grams of methanol, and 195 mls of concentrated hydrochloric acid which was vigorously stirred under reflux. The reflux was continued for approximately 15 minutes, and the solid product was then removed, washed several times with water and recrystallised from toluene. The recrystallised product weighed 446 grams, corresponding to 82% theoretical yield based on the assumed formula $C_4H_7[C_6H_2(CH_3)(C_4H_9)(OH)]_3$, and had a melting point of 180–182° C. The material was recrystallised from petroleum ether (B. Pt. 80–100° C.) and dried at 100° C. for several hours under high vacuum. The product melted at 188° C. with decomposition.

An acetyl derivative was prepared by treating the product with acetic anhydride and sodium acetate, and recrystallised from ethyl alcohol. The recrystallised derivative showed acetyl groups but no hydroxyl radicals on infra-red analysis, and had a melting point of 164° C.

A benzoate derivative was also prepared by treating the product with benzoyl chloride in pyridine.

In Table 1 there are given found and theoretical carbon and hydrogen values and molecular and equivalent weights which show that the formula of the product is $C_{37}H_{52}O_3$, in which the oxygen atoms are contained in three hydroxyl groups.

*Table 1*

| Material | Weight percent | | Mol. Weight | Equivalent Weight |
|---|---|---|---|---|
| | C | H | | |
| Product | 81.3 | 9.9 | | |
| $C_{37}H_{49}(OH)_3$ | 81.6 | 9.6 | | |
| Acetyl derivative | 77.1 | 8.6 | 673 | 231 |
| $C_{37}H_{49}(OCOCH_3)_3$ | 77.0 | 8.7 | 670 | 223 |
| Benzoate | 81.2 | 7.6 | | |
| $C_{37}H_{49}(OCOC_6H_5)_3$ | 81.3 | 7.5 | | |

EXAMPLE 2

35 mls. of concentrated hydrochloric acid were slowly added to a vigorously stirred mixture of 164 grams (1 gram mole) of 3-methyl-6-tert.butylphenol and 23.3 grams (⅓ gram mole) of crotonaldehyde in 500 mls. of glacial acetic acid at room temperature. After 30 minutes precipitated solid was filtered off, washed several times with water, dried, and recrystallised from toluene. The recrystallised product weighed 150 grams and had a melting point of 180–182° C.

The following Examples 3 to 7 illustrate the use of different condensation agents which in each case was slowly added to a mixture comprising ⅓ gram mole of crotonaldehyde, 1 gram mole of 3-methyl-6-tert.butylphenol and 95 grams of methanol stirred under reflux for approximately 30 minutes. The solid which was deposited was filtered off, washed with water and recrystallised as a white solid from toluene. The details of these examples are given in Table 2, in which the product yield percent is based on $C_{37}H_{52}O_3$, the theoretical formula for the expected tris product. In Example 6 the reaction mixture was saturated with hydrogen chloride gas.

EXAMPLE 11

30 grams of cinnamaldehyde were added for 30 minutes to a mixture of 82 grams of 3-methyl-6-tert.butyl phenol, 50 grams of methanol and 21 grams of concentrated hydrochloric acid stirred under reflux. By the time the addition was complete the entire reaction mass was solid, and was washed with water, dried and recrystallised from xylene. The product had a melting point of 260° C, and an analysis of C=83.5% and H=8.9%. Theoretical values for the expected $C_{42}H_{54}O_3$ are C=83.2%, H=8.9%.

EXAMPLE 12

A mixture of 82 grams of 3-methyl-6-tert.butyl phenol, 50 grams of methanol, and 21 grams of concentrated hydrochloric acid were stirred under reflux, during the slow addition of 31 grams of acrolein and for an hour afterwards. Upon the addition of water a syrup formed which was washed with further quantities of water and finally dried under vacuum.

A sample of the product from Example 1 was tested as an antioxidant in polythene, polypropylene, polyethylene terephthalate film, and a medium nitrile rubber. The last had a Mooney viscosity index of 89, was of nominal 32% by weight acrylonitrile content, and was prepared by low temperature polymerisation i.e. at 5° C. The tests were carried out as follows.

(a) *Polythene.*—The induction period of test and control samples in oxygen uptake and oven ageing tests was obtained as follows. Test samples were made by milling polythene (melt flow index 2 by A.S.T.M. method) at 140° C. with 0.1% by weight of the condensate antioxidant product and pressing at 150° C. into sheets ½₀₀ and ¹⁄₁₀₀ of an inch thick respectively. Comparative control samples in which, however, the antioxidant was absent were also prepared.

*Table 2*

| Example | Condensing Agent | | Product | | | Comments |
|---|---|---|---|---|---|---|
| | Type | Quantity | Yield | | M.Pt., °C. | |
| | | | gms. | Percent | | |
| 3 | Conc. hydrochloric acid | 35 mls | 149 | 82 | 180–182 | Mol. Wt. 502±50 (in acetone). |
| 4 | Conc. sulphuric acid | 7 mils | 130 | 72 | 180–182 | Crude product tinged blue-green. |
| 5 | Fluorsulphonic acid | 10 gms | 125 | 69 | 180–182 | Crude product blue. |
| 6 | Hydrogen chloride gas | | 128 | 71 | 180–182 | Do. |
| 7 | Zinc chloride | 14 gms | 116 | 64 | 180–182 | |

The following Examples 8 to 10 illustrate the preparation of crotonaldehyde condensates with different phenols, and also a preferred method of product recovery. In each example ⅓ gram mole of crotonaldehyde was added over 1 hour to a mixture of 1 gram mole of the phenol, 35 mls. of conc. hydrochloric acid, and 95 grams of methanol which was stirred under reflux during the addition. 400 mls. of toluene were then added and the mixture distilled until substantially pure toluene ran as distillate, indicated by an overhead temperature of 110° C. The residue was then cooled, and the resulting white, crystalline solid filtered. Details of Examples 8 to 10 are given in Table 3, in which product yield percent is based on the formula for the expected tris compound.

*Table 3*

| Example | Phenol | M. Pt. °C. | Product | | | | | | | |
|---|---|---|---|---|---|---|---|---|---|---|
| | | | Yield | | Found | | | Theory | | |
| | | | grams | percent | Mol. Wt. | C Wt. percent | H Wt. percent | Mol. Wt. | C Wt. percent | H Wt. percent |
| 8 | 3M6M | 210–212 | 65 | 47 | 402±20 | 80.3 | 7.9 | 418 | 80.4 | 8.1 |
| 9 | 3M6E | 170 | 72 | 47 | 421±20 | 81.0 | 8.7 | 460 | 80.9 | 8.7 |
| 10 | 3M6O | 165 | 200 | 84 | 602±60 | 82.5 | 10.7 | 712 | 82.6 | 10.7 |

3M6M=3,6-dimethylphenol.
3M6E=3-methyl-6-ethylphenol.
3M6O=3-methyl-6-(alpha, alpha, gamma, gamma tetramethyl butyl)phenol.

The following examples illustrate the condensation of different aldehydes with 3-methyl-6-tert.butyl phenol.

Over ageing tests were carried out at 140° C. and 160° C. In the latter case test and control samples of the ¹⁄₁₀₀ of an inch pressings described and measuring 2¼ inches long by ⅞ of an inch wide were placed on microscope slides in an air oven. Samples were removed at intervals and the extent of oxidation was estimated by measuring carbonyl group concentration by infra-red spectroscopy using the absorption band at 5.85 microns wavelength. The time before the oxygen present as carbonyl was greater than 0.4% was measured. This was the induction period.

The oven ageing tests at 140° C. were conducted in similar fashion, except that the antioxidant was incorporated by milling at 140° C. and the samples measuring 1 inch by ⅞ inch were obtained from pressings made at 150° C. and 9/1000 of an inch thick. The extent of oxidation was measured in the same way, except that the time measured was that before the oxygen present as carbonyl was greater than 0.1%.

For the oxygen uptake test small samples of the 1/200 inch test and control pressings were placed in a glass bulb which contained some 5A "Linde" (registered trademark) molecular sieves and which was connected by a U-tube containing mercury to another glass bulb. ("Linde" molecular sieves are synthetic zeolites produced and sold by Union Carbide and Carbon Corporation.) Both bulbs, filled with air, were then sealed and the apparatus placed in a vapour thermostat at 140° C. Movement of the mercury indicated oxidation of the polythene and the time in the vapour thermostat at 140° C. until a notable rate of movement of the mercury was apparent, was measured. This time was the induction period for the oxygen uptake test.

(b) *Nitrile rubber.*—Similar oxygen uptake tests to those described but at 78° C. were applied to thin, raw crepe samples of this material.

(c) *Polyethylene terephthalate.*—Similar oxygen uptake tests were applied at 200° C. to a film of this material 1/1000 inch thick, the test sample of which was coated with a 5% solution of the antioxidant in a 50.50 mixture of toluene and acetone. The time recorded was the number of hours required to absorb in each case 20 and 40 cc. of oxygen per gram of sample.

(d) *Polypropylene.*—Test and control samples of polypropylene were subjected to embrittlement tests as follows. Polypropylene of melt flow index 5 (as measured by the A.S.T.M. method modified by using a 10 kg. weight instead of that specified for causing extrusion) was mixed on open rolls at 175° C. with twelve different batches of the 3-methyl-6-tertiary butyl phenol/crotonaldehyde condensate, the results quoted in the table representing in each case the averaged results for four different batches.

Thin sheets about 1/50 of an inch thick were prepared by moulding at 190–195° C. from each of the compositions obtained.

These sheets were held suspended from metal clips in an air oven at 140° C. until they were found to be brittle when handled.

The results of these tests are given in Table 4.

*Table 4*

| Medium | Antioxidant Content Wt. Percent | Induction Period Hours | | | | | | Embrittlement |
|---|---|---|---|---|---|---|---|---|
| | | Oxygen uptake | | | | Oven ageing | | |
| | | 78° C. | 140° C. | 200° C. | | 140° C. | 160° C. | 140° C. |
| | | | | 20 cc. | 40 cc. | | | |
| Polythene | Nil | | 2½ | | | 2½ | 2½ | |
| | 0.1 | | 60 | | | 70 | 30 | |
| Nitrile rubber | Nil | 10 | | | | | | |
| | 1 | 140 | | | | | | |
| Polyethylene terephthalate | Nil | | | 2½ | 16 | | | |
| | Coated | | | 19 | 40 | | | |
| Polypropylene | Nil | | | | | | | <25 |
| | 0.1 | | | | | | | 50 |
| | 0.2 | | | | | | | 90 |
| | 0.5 | | | | | | | 310 |

Polythene and polypropylene samples were also submitted to staining tests. A sample of the former material in which 1% of the 3-methyl-6-tert. butyl phenol-crotonaldehyde condensate was incorporated showed no colour formation after milling for 3 hours at 160° C.

Samples of polypropylene measuring 1½ by ½ by 1/50 inches and incorporating respectively 0.5 and 0.25% by weight of a condensate, according to the present invention, of 3-methyl-6-tert. butylphenol and crotonaldehyde, were held for 24 hours at a distance of 10 cms. from a 500 watt high pressure mercury arc Hanovia S. 500 source of ultra-violet light, screened by ½ mm. Pyrex glass cutting out light of less than 2850 A. The samples were then compared visually with a scale showing a range from 0=no colour to 6=black. Both were equivalent to 0 on the scale, showing that substantially no staining took place.

What is claimed is:

1. Tris (hydroxyphenyl) propane compounds of the structure:

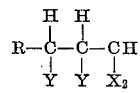

wherein R is selected from the group consisting of hydrogen and methyl, X is selected from the group consisting of 3-lower alkyl, 6-lower tertiary alkyl hydroxyphenyl attached to the carbon atom directly by its ortho position and 3-lower alkyl, 6-lower tertiary alkyl hydroxyphenyl attached to the carbon atom directly by its para position, and Y is selected fro mthe group consisting of hydrogen and X with one Y being hydrogen and one Y being the same as X.

2. Tris (hydroxyphenyl) propane compounds according to claim 1 in which R is hydrogen and X is 3 methyl-6-tert. butyl phenol.

3. Tris (hydroxyphenyl) propane compounds according to claim 1 in which R is methyl and X is 3 methyl-6-tert. butyl phenol.

4. A process for the preparation of tris (hydroxyphenyl) propane compounds which comprises contacting about three molar proportions of a phenol substituted in the three and six positions only with lower alkyl groups under condensation conditions, with one molar proportion of an alpha-beta unsaturated aldehyde having an unsubstituted alpha carbon atom, in an inert solvent selected from the group consisting of methanol and acetic acid and in the presence of an acid condensation agent.

5. A process according to claim 4 wherein toluene is added to the reaction mixture after condensation is completed and the resulting mixture is distilled to remove condensation water and solvent by entrainment with the toluene, a sufficient quantity of toluene being provided for crystallizing a product from the residual liquid.

References Cited by the Examiner

UNITED STATES PATENTS

| | | | |
|---|---|---|---|
| 2,602,821 | 7/52 | Luten et al. | 260—619 |
| 2,779,800 | 1/57 | Holm et al. | 260—619 |
| 2,801,989 | 8/57 | Farnham | 260—619 X |
| 2,856,383 | 10/58 | Knowles et al. | 260—45.95 |
| 2,919,294 | 12/59 | Beaver et al. | 260—619 |
| 2,945,001 | 7/60 | Spacht | 260—45.95 |

FOREIGN PATENTS 480,524  7/52  Canada.

LEON ZITVER, *Primary Examiner.*

ALPHONSO D. SULLIVAN, CHARLES B. PARKER, *Examiners.*